(12) United States Patent
Gedenk et al.

(10) Patent No.: US 8,882,087 B2
(45) Date of Patent: Nov. 11, 2014

(54) PNEUMATIC SPRING DEVICE FOR A RAIL VEHICLE

(75) Inventors: Volker Gedenk, Hemmingen (DE); Bernd Hesse, Laatzen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 25 days.

(21) Appl. No.: 13/562,027

(22) Filed: Jul. 30, 2012

(65) Prior Publication Data

US 2012/0313303 A1 Dec. 13, 2012

Related U.S. Application Data

(63) Continuation of application No. PCT/EP2010/068705, filed on Dec. 2, 2010.

(30) Foreign Application Priority Data

Feb. 3, 2010 (DE) .......................... 10 2010 000 290

(51) Int. Cl.
*F16F 9/05* (2006.01)
*F16F 9/04* (2006.01)

(52) U.S. Cl.
CPC ............. *F16F 9/0409* (2013.01); *F16F 9/0454* (2013.01)
USPC .................................................... 267/64.27

(58) Field of Classification Search
CPC ............. F16F 9/04; F16F 9/0409; F16F 9/05; F16F 9/052; F16F 9/055; F16F 9/057
USPC ........... 267/64.27, 64.21, 64.19, 64.23, 64.24
See application file for complete search history.

(56) References Cited

U.S. PATENT DOCUMENTS

| 3,549,142 | A | * | 12/1970 | Tilton ......................... 267/64.24 |
| 3,895,787 | A | * | 7/1975 | Niehus et al. ...................... 267/3 |
| 3,897,941 | A | * | 8/1975 | Hirtreiter et al. ........... 267/64.24 |
| 5,253,850 | A | * | 10/1993 | Burkley et al. ............. 267/64.24 |
| 5,382,006 | A |   | 1/1995 | Arnold |
| 5,535,994 | A | * | 7/1996 | Safreed, Jr. ................. 267/64.27 |
| 5,580,033 | A | * | 12/1996 | Burkley et al. ............. 267/64.27 |
| 5,934,652 | A | * | 8/1999 | Hofacre et al. ............. 267/64.27 |
| 6,264,178 | B1 | * | 7/2001 | Schisler et al. ............. 267/64.27 |

(Continued)

FOREIGN PATENT DOCUMENTS

| DE | 2108694 A1 | 8/1972 |
| DE | 40 11 517 A1 | 10/1991 |
| EP | 1 593 873 A1 | 11/2005 |
| SU | 1333911 A1 | 8/1987 |

OTHER PUBLICATIONS

International Search Report dated Mar. 21, 2011 of international application PCT/EP 2010/068705 on which this application is based.

*Primary Examiner* — Thomas Irvin
(74) *Attorney, Agent, or Firm* — Walter Ottesen P.A.

(57) ABSTRACT

The invention is directed to a pneumatic spring device (3) of a rail vehicle (1). The device includes a pneumatic spring bellows (5), which is provided on both ends with a bead ring (6, 7), wherein the bead ring (6, 7) has a core made of two core rings (10, 11, 13, 14) positioned separately in the bead ring and the reinforcement elements (12) are guided in an S shape between the core rings and loop around the latter.

5 Claims, 4 Drawing Sheets

(56) References Cited

U.S. PATENT DOCUMENTS 6,460,836 B1 * 10/2002 Trowbridge ............... 267/64.27
8,403,307 B2 * 3/2013 Koeske et al. ............. 267/64.27
2007/0257409 A1 11/2007 Szyszka et al.
2011/0266728 A1 * 11/2011 Bank ......................... 267/64.27
2013/0270753 A1 * 10/2013 Balachonzew et al. .... 267/64.27

\* cited by examiner

PNEUMATIC SPRING DEVICE FOR A RAIL VEHICLE

CROSS REFERENCE TO RELATED APPLICATIONS

This application is a continuation application of international patent application PCT/EP 2010/068705, filed Dec. 2, 2010, designating the United States and claiming priority from German application 10 2010 000 290.9, filed Feb. 3, 2010, and the entire content of both applications is incorporated herein by reference.

FIELD OF THE INVENTION

The invention relates to a pneumatic spring device for a rail vehicle, comprising a pneumatic spring bellows which is arranged between a sprung chassis (a rail vehicle) and an unsprung subframe (bogie) and is provided with reinforcement, which are embedded in the bellows material, as reinforcing elements, wherein individual layers or a plurality of layers of reinforcements or fabric layers made of reinforcements can be provided. At both ends, the pneumatic spring bellows has a bead ring for fastening or clamping the pneumatic spring bellows to correspondingly designed stop rings (flanges) of the chassis and unsprung subframe, wherein the bead ring is provided with a core, and the reinforcements loop or engage around the core, that is, are customarily guided around the cores at a certain distance.

BACKGROUND OF THE INVENTION

A multiplicity of pneumatic spring systems/a pneumatic spring device comprising pneumatic spring bellows which have particular embodiments of the bead rings and looping around by means of the reinforcements are known in the prior art.

One problem of fastening or clamping the pneumatic spring bellows to the stop rings or flanges of the chassis or of the subframe consists in the absorbing of the relatively heavily pronounced movements of a pneumatic spring system of this type. In contrast to pneumatic springs in motor vehicles, pneumatic spring systems for rail vehicles have to absorb heavy vertical, horizontal and torsional movements. These result in relative movements, which may cause severe wear of the pneumatic springs, in the region of the clamping points.

This in particular has disadvantages if the reinforcing fabric, that is, the reinforcements, are arranged close to the surface of the pneumatic springs and therefore, at the ends of the pneumatic springs, are also arranged in the region of the clamping point and in the vicinity of the flanges. If the surface material of the pneumatic spring, which is generally composed of rubber, is subjected to severe frictional wear due to relative movements, the reinforcements may also be damaged. One countermeasure is to apply additional rubber layers, but this makes production expensive and also does not provide a fundamental remedy.

The heavily pronounced vertical, horizontal and torsional movements may also result in reinforcements being damaged and the force transmission between the core and reinforcements no longer being pronounced.

To this end, DE 40 11 517 A1 discloses a pneumatic spring bellows for rail vehicles, the pneumatic spring bellows having embedded reinforcing layers or reinforcements and being provided with annular beads which are each reinforced by an inner core ring. The pneumatic spring bellows is vulcanized onto the stop ring in the clamping or bearing region formed between the bead ring, referred to here as the "annular bead", and stop ring. This prevents movements between the bellows surface and the generally metallic stop ring and, in consequence, avoids abrasion of the bellows material. A disadvantage in this case is the relatively costly production of vulcanized connections of this type.

In order to improve the resistance to severe vertical, horizontal and torsional movements, DE 21 08 694 C2 discloses an optimization of the connection of the reinforcements and core by a particular shaping, rounded in an elongated manner, of the core and a correspondingly formed looping around by means of the reinforcements. However, the abovementioned abrasion problem is still not solved by the above.

SUMMARY OF THE INVENTION

Therefore, it is an object of the invention to provide a pneumatic spring device which is suitable for a rail vehicle, operates reliably and in a manner free from wear even in the event of high loads and severe movements between the chassis and subframe and which can be produced in a simple manner and without additional machining work.

According to a feature of the invention, the bead ring has a core made of two core rings positioned separately in the bead ring, wherein the reinforcement elements are guided in an S-configuration between the core rings and loop around the latter. This permits reliable embedding and force transmission to the reinforcement elements. In particular owing to the fact that a long "transition", that is, a long and parallel return of the reinforcement elements after looping around a core, can be omitted, the solution according to the invention provides sufficient clearance for embedding the reinforcement elements in a manner which permits as little damage as possible due to overloading.

An advantageous feature of the invention provides that starting from the central part of the pneumatic spring bellows, the reinforcement elements enter into the S-shaped looping around the core rings at a distance from the clamping region formed between the bead ring and stop ring. Damage due to frictional wear in the contact region between the pneumatic spring and stop ring/flange is thereby additionally minimized.

A further advantageous embodiment consists in that the S-shaped looping around of the core rings takes place in such a manner that the latter are "pulled together", that is, are braced against one another, with the reinforcement elements being clamped, by means of a tensile stress arising in the reinforcements. As a result, tensile loads in the reinforcement elements reinforce the clamping and therefore permit an increased and reliable force transmission to the core rings.

A further advantages embodiment consists in that at least one of the core rings is designed as a wound core. By means of such an embodiment, in which, for example in order to form the core cross section, a filament is repeatedly wound around the bellows blank, burst pressures of equivalent magnitude as with the conventional steel core have already been obtained in tests. Particularly simple production is therefore achieved with consistent sealing quality. The winding filament may be composed of, for example, plastic or else of metal, that is, of thin wire.

As already explained initially herein, the pneumatic spring system according to the invention is particularly suitable for a rail vehicle.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
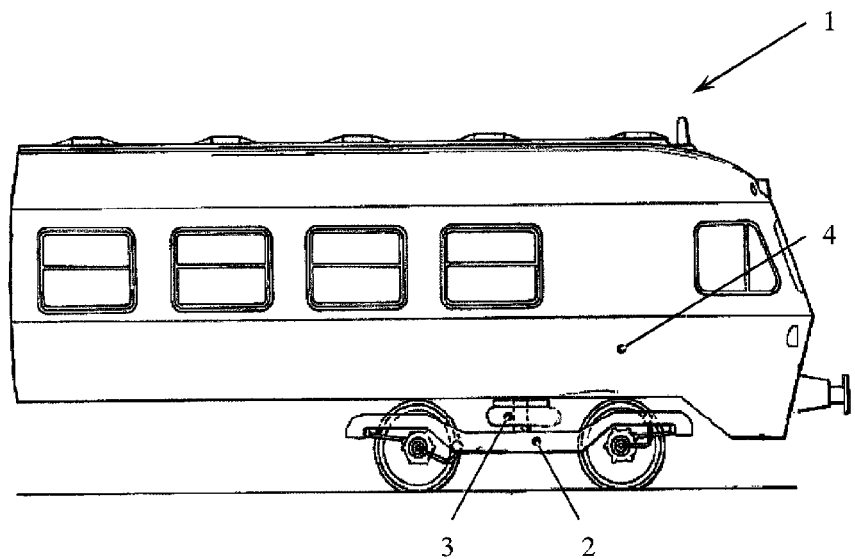
FIG. 1 shows the front part of a short-range rail vehicle.

FIG. 1 shows the front part of a short-range rail vehicle 1 with a subframe or bogie 2 which is connected to the chassis 4 of the rail vehicle 1 via a pneumatic spring device 3 according to the invention.

Figure 2:
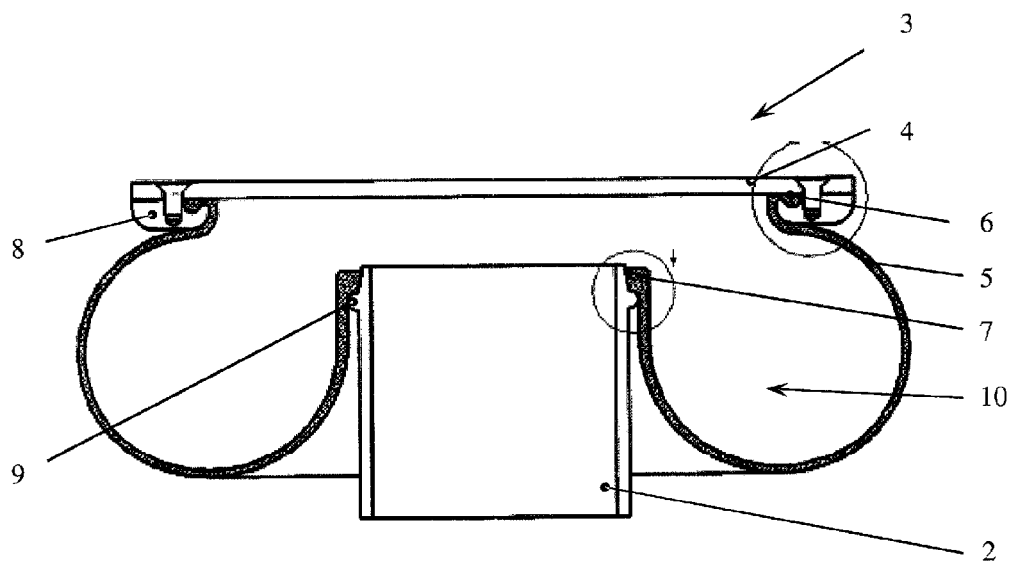
FIG. 2 shows a pneumatic spring device according to the invention in an enlarged section view.

FIG. 2 shows the pneumatic spring device 3 in an enlarged section view. FIG. 2 shows the pneumatic spring bellows 5 which is arranged between sprung chassis 4 and an unsprung subframe. The pneumatic spring bellows is provided with reinforcement elements embedded in the bellows material and, at both ends, has a bead ring (6, 7) for clamping the pneumatic spring bellows to correspondingly designed stop rings (8, 9) of the chassis 4 and the unsprung subframe, that is, bogie 2.

Figure 3:
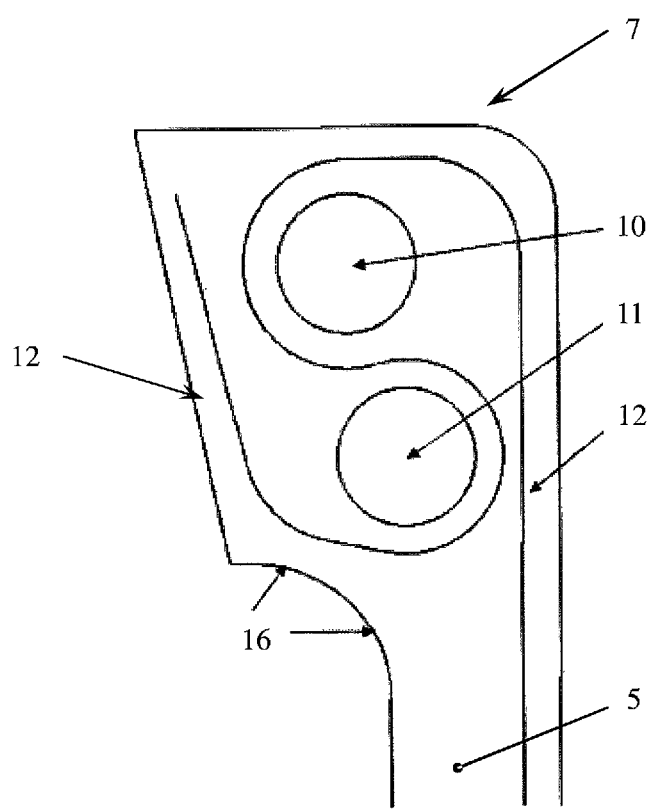
FIG. 3 shows the lower bead ring of the pneumatic spring bellows of the pneumatic spring device according to the invention, the bead ring being fastened to the unsprung subframe.

FIG. 3 shows, in an enlarged view, the lower bead ring 7 of the pneumatic spring bellows 5 with the bead ring being fastened to the unsprung bogie 2. The bead ring 7 is provided with a core made of two core rings 10 and 11 positioned separately in the bead ring. The reinforcement elements 12 are guided in an S-shaped configuration between the core rings 10 and 11 and loop around the latter.

Figure 4:
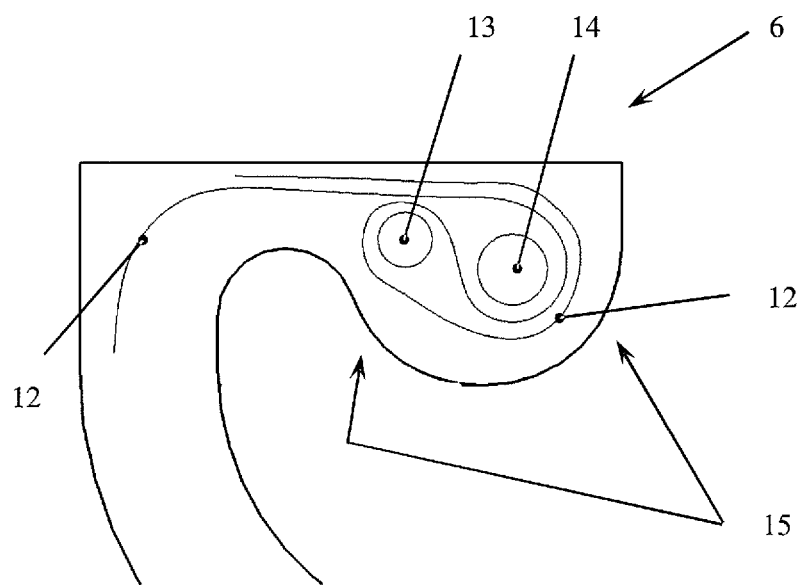
FIG. 4 shows the upper bead ring of the pneumatic spring bellows of the pneumatic spring device according to the invention, the bead ring being fastened to the chassis; and, FIG. 5 is a schematic showing the lower bead ring of the pneumatic spring bellows wherein at least one of the core rings is configured as a wound core.

FIG. 4 shows, in an enlarged view, the upper bead ring 6 of the pneumatic spring bellows 5 with the bead ring being fastened to the chassis 4. The bead ring 6 is also provided with a core made of two core rings 13 and 14 positioned separately in the bead ring. The reinforcement elements 12 are guided in an S-shaped configuration between the core rings 13 and 14 and loop around the latter.

FIGS. 3 and 4 also show that, starting from the central part of the pneumatic spring bellows 5, the reinforcement elements 12 enter into the S-shaped looping around of the core rings (10, 11, 13, 14) at a distance from the clamping region (15, 16) formed in each case between the bead ring (6, 7) and stop ring (8, 9).

Figure 5:
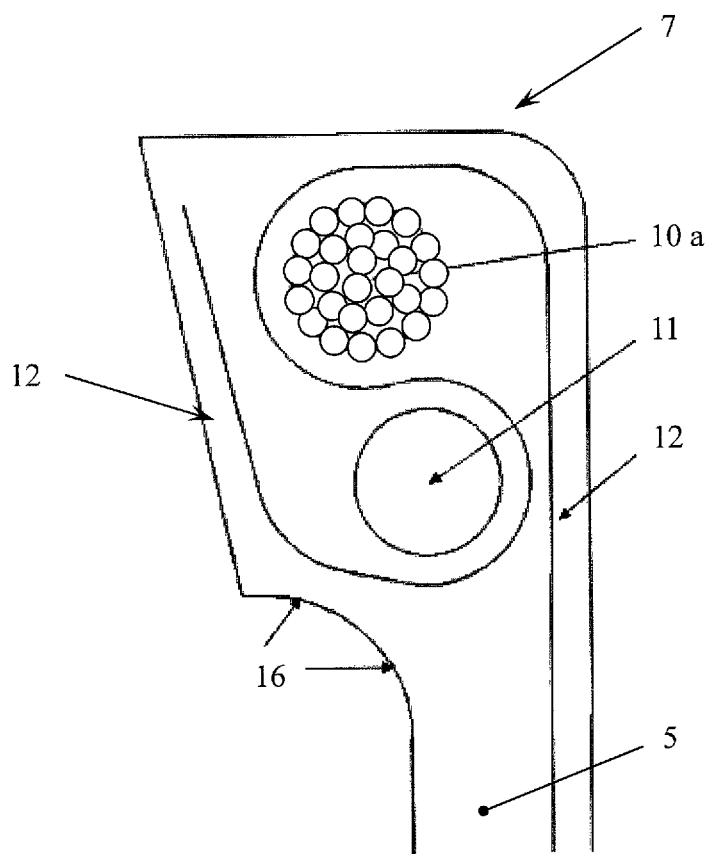

FIG. 5 shows an embodiment wherein at least one of the core rings (10, 11, 13, 14) is configured as a wound core. With this embodiment, a filament 10a is wound many times about the bellows blank to form the core cross section. The filament 10a is made, for example, of plastic or even of metal, that is, a thin wire.

It is understood that the foregoing description is that of the preferred embodiments of the invention and that various changes and modifications may be made thereto without departing from the spirit and scope of the invention as defined in the appended claims.

LIST OF REFERENCE NUMBERS

Part of the Description 1 short-range rail vehicle
2 bogie
3 pneumatic spring device
4 chassis
5 pneumatic spring bellows
6 bead ring
7 bead ring
8 stop ring
9 stop ring
10 core ring
11 core ring
12 reinforcement elements
13 core ring
14 core ring
15 clamping region
16 clamping region

What is claimed is:

1. A pneumatic spring device for a rail vehicle having a sprung chassis and an unsprung subframe, the pneumatic spring device comprising:

a pneumatic spring bellows having a plurality of reinforcement elements embedded therein and having first and second ends;

first and second stop rings on said sprung chassis and said unsprung subframe, respectively;

first and second bead rings on said first and second ends to facilitate clamping said spring bellows to said first and second stop rings, respectively;

each one of said bead rings including a core of two mutually separate core rings disposed therein in spaced relationship to each other;

the core rings in each one of said bead rings and the stop ring corresponding thereto conjointly defining a clamping region therebetween within the bead rings and on a first side of said core rings;

said reinforcement elements passing into said bead rings on a second side of said core rings lying opposite said first side thereof and at a location outside of and away from said clamping region; and, said reinforcing elements extending deep into said bead rings and past both of said core rings on said second side thereof before passing into an S-configuration between said core rings so as to form a loop around said core rings.

2. The pneumatic spring device of claim 1, wherein the S-configuration looping around said core rings is placed in such a manner that the core rings are tensioned with respect to each other because of a tensile stress arising in the reinforcement elements when the latter are clamped.

3. The pneumatic spring device of claim 1, wherein at least one of the core rings is configured as a wound core.

4. The pneumatic spring device of claim 1, wherein said pneumatic spring bellows has a mid region; and, said reinforcement elements, after forming said loop around said core rings, pass back through the bead rings outside of said clamping region toward said mid region.

5. A rail vehicle comprising:
a sprung chassis;
an unsprung subframe;
a pneumatic spring device including:
a pneumatic spring bellows having a plurality of reinforcement elements embedded therein and having first and second ends;
first and second stop rings on said sprung chassis and said unsprung subframe, respectively;
first and second bead rings on said first and second ends to facilitate clamping said spring bellows to said first and second stop rings, respectively;

each one of said bead rings including a core of two mutually separate core rings disposed therein in spaced relationship to each other;

the core rings in each one of said bead rings and the stop ring corresponding thereto conjointly defining a clamping region therebetween within the bead rings and on a first side of said core rings;

said reinforcement elements passing into said bead rings on a second side of said core rings lying opposite said first side thereof and at a location outside of and away from said clamping region; and, said reinforcing elements extending deep into said bead rings and past both of said core rings on said second side thereof before passing into an S-configuration between said core rings so as to form a loop around said core rings.

* * * * *